United States Patent
Hirama et al.

(10) Patent No.: US 12,417,515 B2
(45) Date of Patent: Sep. 16, 2025

(54) IMAGE PROCESSING APPARATUS AND CONTROL METHOD THEREFOR

(71) Applicant: CANON KABUSHIKI KAISHA, Tokyo (JP)

(72) Inventors: Tomohiro Hirama, Saitama (JP); Takumi Tosaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 158 days.

(21) Appl. No.: 18/175,372

(22) Filed: Feb. 27, 2023

(65) Prior Publication Data
US 2023/0281776 A1 Sep. 7, 2023

(30) Foreign Application Priority Data
Mar. 2, 2022 (JP) .................................. 2022-031995

(51) Int. Cl.
G06T 5/50 (2006.01)
G06V 10/74 (2022.01)
H04N 23/55 (2023.01)

(52) U.S. Cl.
CPC .............. G06T 5/50 (2013.01); G06V 10/761 (2022.01); H04N 23/55 (2023.01); G06T 2207/20221 (2013.01)

(58) Field of Classification Search
CPC ........ H04N 23/00; H04N 23/45; H04N 23/55; G06V 10/761; G06T 2207/20221; G06T 5/50
USPC .......................................................... 345/418
See application file for complete search history.

(56) References Cited

U.S. PATENT DOCUMENTS

| 9,857,663 | B1* | 1/2018 | McClatchie | G03B 13/36 |
| 12,111,561 | B2* | 10/2024 | Shabtay | G02B 13/02 |
| 2018/0075583 | A1* | 3/2018 | Hayasaka | G06T 5/73 |
| 2022/0137383 | A1* | 5/2022 | Anhut | G02B 21/0032 |
| | | | | 359/368 |
| 2023/0057977 | A1* | 2/2023 | Thibault | G02B 27/1073 |

FOREIGN PATENT DOCUMENTS

| JP | 2011078008 A | 4/2011 |
| JP | 2018046535 A | 3/2018 |

(Continued)

OTHER PUBLICATIONS

Yanusik I, Kalinina A, Morozov A, Lee JH. Pupil replication waveguide system for autostereoscopic imaging with a wide field of view . Optics Express. Oct. 25, 2021;29(22):36287-301.*

(Continued)

*Primary Examiner* — Phu K Nguyen
(74) *Attorney, Agent, or Firm* — Canon U.S.A., Inc., IP Division (57) ABSTRACT

An image processing apparatus includes an acquisition unit for acquiring an image obtained by an image capturing apparatus including an image sensor for capturing a light beam from a subject through an optical lens, and a generation unit for generating first subject distance information indicating a distance from the image capturing apparatus to the subject based on information corresponding to an entrance pupil position of the optical lens used to capture the image, a focus position, and second subject distance information indicating a distance from the image sensor to the subject.

16 Claims, 9 Drawing Sheets

(56) References Cited

FOREIGN PATENT DOCUMENTS

JP 2020010269 A 1/2020
JP 2021136684 A 9/2021

OTHER PUBLICATIONS

Wang J, Mou X. 19.3: Evaluation of entrance pupil location in measuring VRIAR eyewear displays: Theoretical and experimental analyses in field of view. InSID Symposium Digest of Technical Papers Aug. 2021 (vol. 52, pp. 261-265).*

* cited by examiner

IMAGE PROCESSING APPARATUS AND CONTROL METHOD THEREFOR

BACKGROUND

Field

The present disclosure relates to combining processing in visual effects (VFX).

Description of the Related Art

In the field of video production, visual effects (VFX) are used to provide special screen effects (visual effects) to create non-realistic images and are realized by combining computer graphics (CG) with captured real images. The combining processing is typically performed at a post-production stage after images are captured. Recently, there has been a growing need for creating CG in advance and capturing images while checking a video image combined with the CG in real time on site. In the combining processing, it is important to set imaging ranges such that the imaging range of captured real images in image capturing matches the imaging range of CG. Accordingly, the combining processing is performed using imaging parameters (hereinafter referred to as metadata) superimposed on each frame in the imaging range of the captured real video image. Japanese Patent Application Laid-Open No. 2020-10269 discusses a technique in which a subject distance is defined as the total value of a focal length from a front-side principal point position of an imaging lens and a distance from a focal position to a subject, and a change in magnification of an image along with the movement of a focus lens is corrected. In addition, Japanese Patent Application Laid-Open No. 2011-78008 discusses a technique for reliably identifying a subject in each content, easily managing camerawork information and the like, and acquiring content data in consideration of the relationships among materials of various elements when content data is created using combinations of materials.

The subject distance discussed in Japanese Patent Application Laid-Open No. 2020-10269 is a distance from an entrance pupil position within a lens to an in-focus subject. This subject distance is different from a distance from an imaging plane to a subject that is normally recognized as the subject distance by a user, and cannot be used for combining an image with computer graphics (CG). In addition, the subject distance discussed in Japanese Patent Application Laid-Open No. 2011-78008 is a distance measured by an automatic focusing mechanism included in an optical focus adjustment unit. This subject distance cannot be used to combine an image with CG, accordingly.

SUMMARY

The present disclosure is directed to providing an image capturing apparatus and an image processing apparatus that make it possible to perform CG combining processing even when the user cannot recognize the subject distance that is used for CG combining processing and is defined as the distance from the imaging plane to the subject.

According to an aspect of the present disclosure, an image processing apparatus includes an acquisition unit configured to acquire an image obtained by an image capturing apparatus including an image sensor configured to capture a light beam from a subject through an optical lens, and a generation unit configured to generate first subject distance information indicating a distance from the image capturing apparatus to the subject based on information corresponding to an entrance pupil position of the optical lens used to capture the image, a focus position, and second subject distance information indicating a distance from the image sensor to the subject.

According to another aspect of the present disclosure, a control method for an image processing apparatus includes acquiring an image obtained by an image capturing apparatus including an image sensor configured to capture a light beam from a subject through an optical lens, and generating first subject distance information indicating a distance from the image capturing apparatus to the subject based on information corresponding to an entrance pupil position of the optical lens used to capture the image, a focus position, and second subject distance information indicating a distance from the image sensor to the subject.

Further features of the present disclosure will become apparent from the following description of exemplary embodiments with reference to the attached drawings.

DESCRIPTION OF THE EMBODIMENTS

Exemplary embodiments of the present disclosure will now be described with reference to the drawings. The following exemplary embodiments are not meant to limit the scope of the present disclosure as encompassed by the claims. While multiple features are described in the following exemplary embodiments, not all of the features described in the exemplary embodiments are necessarily deemed to be essential for the present disclosure and the features may be combined as appropriate.

First Exemplary Embodiment

Figure 1:
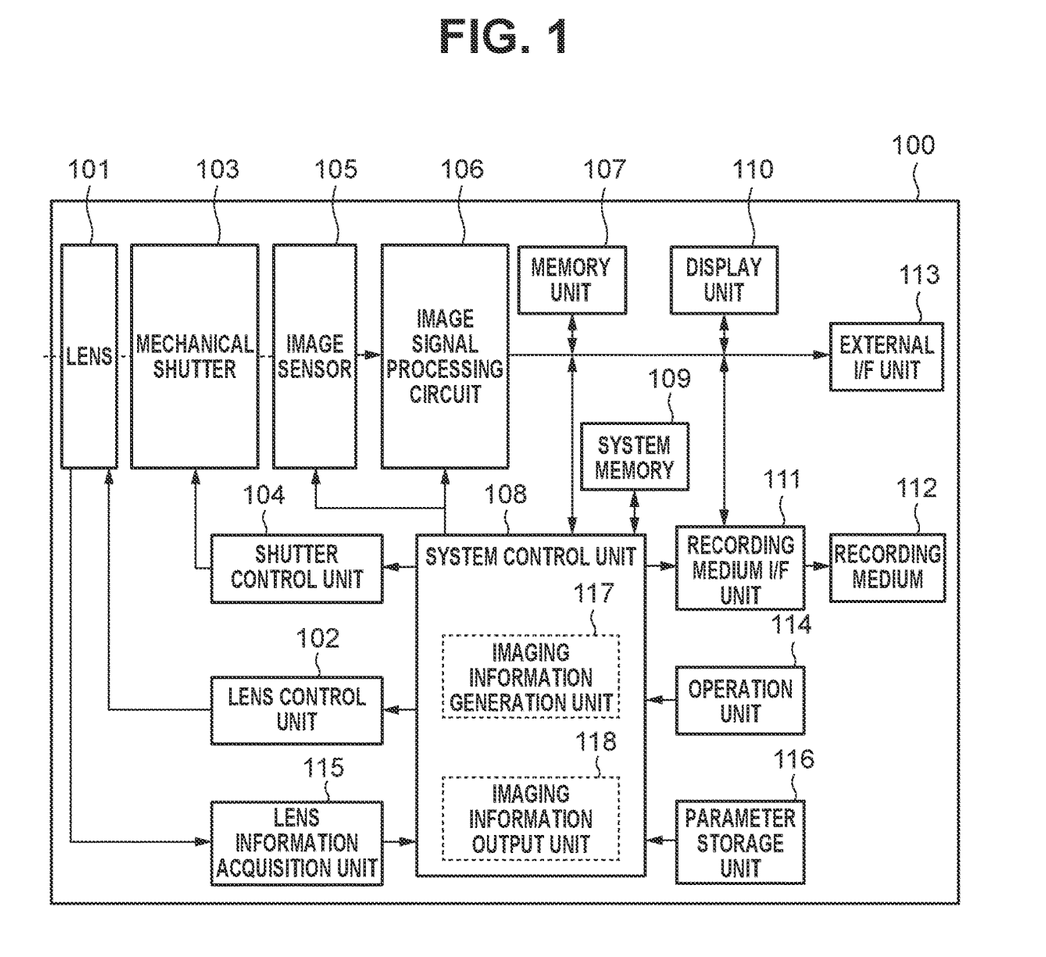
FIG. 1 is a block diagram illustrating a configuration example of an image capturing apparatus according to a first exemplary embodiment.

FIG. 1 is a block diagram illustrating an image capturing apparatus 100 according to a first exemplary embodiment.

The image capturing apparatus 100 includes a lens 101, a lens control unit 102, a mechanical shutter 103, and a shutter control unit 104. The image capturing apparatus 100 further includes an image sensor 105, an image signal processing circuit 106, a memory unit 107, a system control unit 108, a system memory 109, a display unit 110, and a recording medium interface (I/F) unit 111. The image capturing apparatus 100 still further includes a recording medium 112, an external I/F unit 113, an operation unit 114, a lens information acquisition unit 115, a parameter storage unit 116, an imaging information generation unit 117, and an imaging information output unit 118.

The lens 101 includes an optical lens and various mechanisms for implementing, for example, a zooming mechanism, a focusing mechanism, a diaphragm mechanism, and an image shake correction mechanism. The optical lens and the various mechanisms are driven and controlled by the lens control unit 102 or a focus ring and a zoom lens that are mounted on the lens 101. A light beam from a subject passes through the lens 101 and the light beam is focused on an imaging plane on the image sensor 105, and thereby a subject image is captured. The lens 101 can be a lens integrated with the image capturing apparatus 100, or can be an interchangeable lens formed separately from the image capturing apparatus 100. The subject image formed on the imaging plane of the image sensor 105 is photoelectrically converted. Further, a gain adjustment and an analog-to-digital (A/D) conversion to convert an analog signal into a digital signal are performed on the subject image. The digital signal thus obtained is transmitted to the image signal processing circuit 106 as R, Gr, Gb, and B signals. The image signal processing circuit 106 performs various image signal processing, such as development processing, low-pass filter processing to reduce noise, shading processing, white balance (WB) processing, and cyclic noise reduction (NR) processing, and further performs various correction processing, image data compression processing, and the like. The mechanical shutter 103 is driven and controlled by the shutter control unit 104. The memory unit 107 temporarily stores image data.

The system control unit 108 performs the overall control operation and various arithmetic operations on the image capturing apparatus 100. The system memory 109 stores arithmetic processing results from the system control unit 108. The display unit 110 displays image data. The recording medium I/F unit 111 records image data into the recording medium 112 or reads out image data from the recording medium 112. The external I/F unit 113 is an interface for communicating with an external computer, a video image input device or the like. The operation unit 114 is used for the user to input drive conditions and to make various settings for the image capturing apparatus 100. The drive conditions and various setting values are transmitted to the system control unit 108. The system control unit 108 performs the overall control operation for the image capturing apparatus 100 based on these pieces of information.

The lens information acquisition unit 115 acquires a focal length, a focus position, a subject distance, a field angle, and the like corresponding to the driving status of the lens 101, and sends the acquired lens information to the system control unit 108. The parameter storage unit 116 stores parameters to be used for the imaging information generation unit 117 to generate information, provides the parameters to the system control unit 108, and holds parameters input by the operation unit 114.

The imaging information generation unit 117 generates imaging information based on information about, for example, the lens 101, the image sensor 105, the lens information acquisition unit 115, and the parameter storage unit 116, each of which constituting the image capturing apparatus 100. The generated imaging information and information about the image capturing apparatus 100 are stored in a predetermined area as metadata to be associated with image data.

Figure 2:
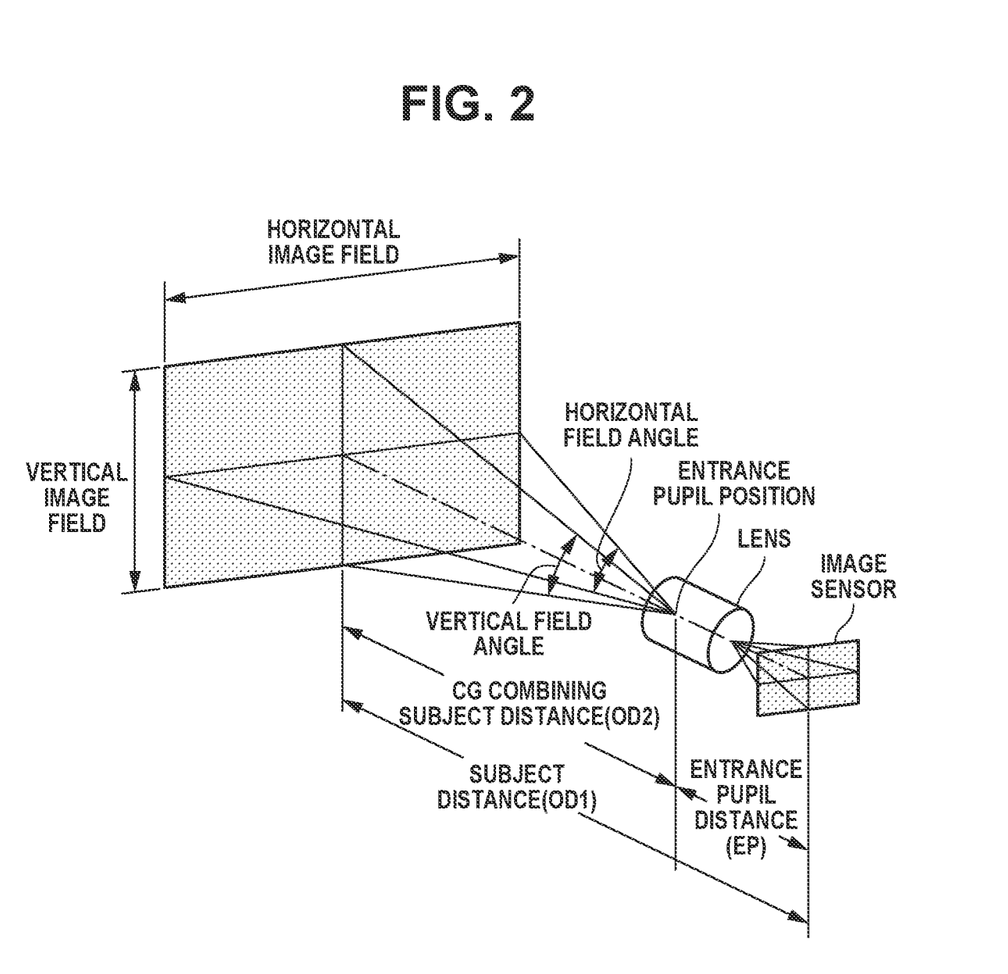
FIG. 2 illustrates relationships among optical distances according to first, second, third, and fourth exemplary embodiments.

FIG. 2 illustrates an example of imaging information generated by the imaging information generation unit 117. The imaging information generation unit 117 generates at least one of information about a horizontal field angle and a vertical field angle and CG combining subject distance information illustrated in FIG. 2. The imaging information output unit 118 outputs various information generated by the imaging information generation unit 117 and information acquired by the lens information acquisition unit 115 via the external I/F unit 113 or the recording medium I/F unit 111.

Figure 3:
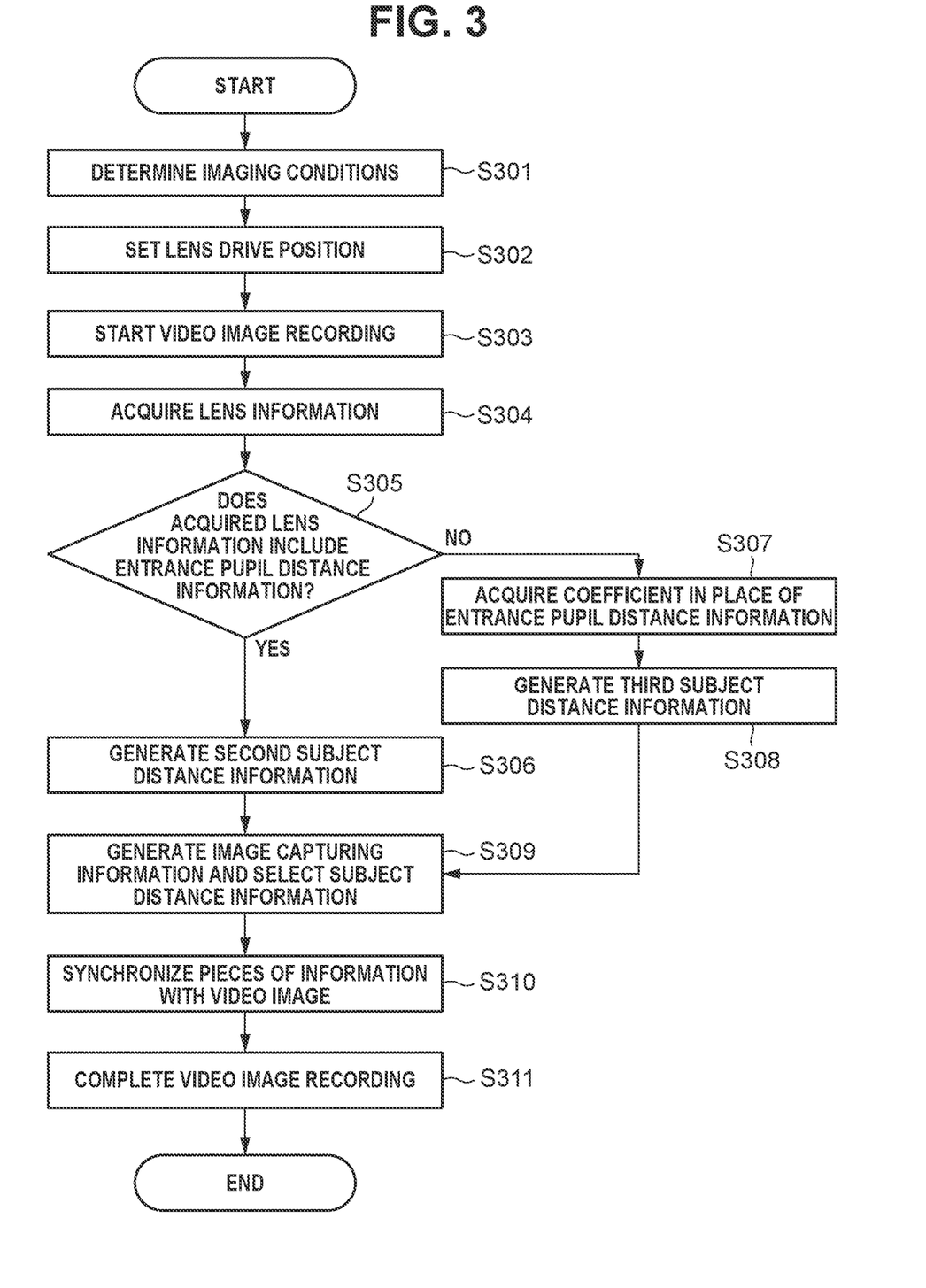
FIG. 3 is a flowchart illustrating computer graphics (CG) combining metadata generation processing according to the first exemplary embodiment.
Figure 4:
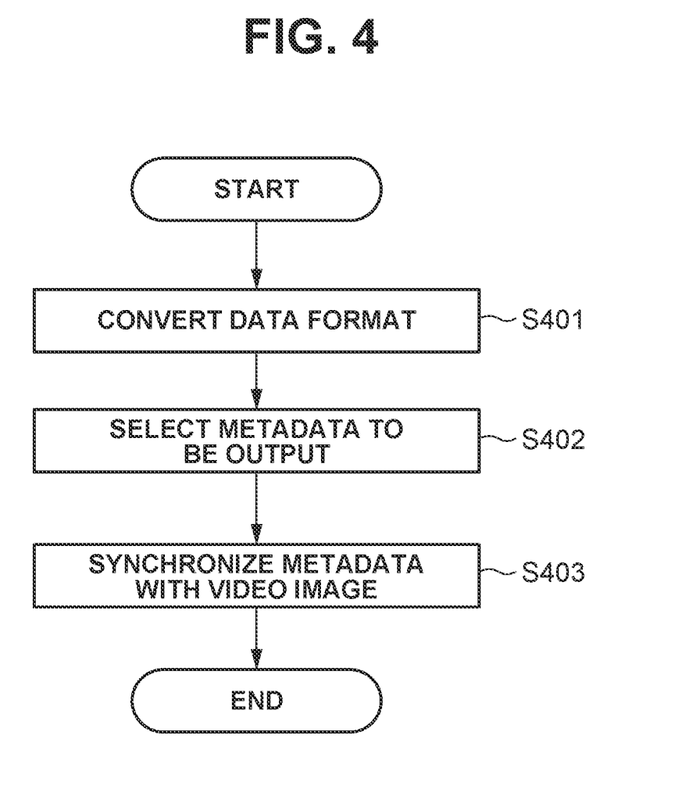
FIG. 4 is a flowchart illustrating CG combining metadata generation processing according to the first exemplary embodiment.

An operation of the imaging information generation unit 117 according to the present exemplary embodiment having the configuration as described above will now be described with reference to the block diagram illustrated in FIG. 1 and flowcharts illustrated in FIGS. 3 and 4. The processing illustrated in FIGS. 3 and 4 is repeatedly executed on an arbitrary predetermined cycle, such as an image capturing cycle. In the present exemplary embodiment, the image capturing cycle is used for the predetermined cycle.

In step S301, the system control unit 108 determines imaging conditions and sets an exposure area for the image sensor 105. In the present exemplary embodiment, a super 35 mm area is set for a 35 mm fullsize sensor, but instead any other imaging range can be set. In step S302, the system control unit 108 sets an imaging position, a focal length, a focus position, and the like at initial positions. These settings can be made by using the focus ring or the zoom ring mounted on the lens 101, or through communication from the operation unit 114 to the lens 101.

In step S303, the system control unit 108 starts video image recording. Depending on mode settings, the system control unit 108 can start video image delivering via the external I/F unit 113 without recording the video image. In this case, the focal length, the focus position, and the like can be changed at any time.

In step S304, the system control unit 108 acquires lens information, including subject distance information (first subject distance information) and field angles (first horizontal field angle and first vertical field angle), from the lens information acquisition unit 115.

In step S305, the system control unit 108 determines whether the lens information acquired in step S304 includes entrance pupil distance information as information corresponding to the entrance pupil position.

The entrance pupil distance information to be acquired is information that is preliminarily stored in a memory in the lens 101 or a server, is received by the image capturing apparatus 100 at an arbitrary timing, and is stored in the memory unit 107 in the image capturing apparatus 100. Alternatively, the entrance pupil distance information can be acquired during the operation in step S304. If the system control unit 108 determines that the acquired lens information includes the entrance pupil distance information (YES in step S305), the processing proceeds to step S306. If the system control unit 108 determines that the acquired lens information does not include the entrance pupil distance information (NO in step S305), the processing proceeds to step S307.

In step S306, the system control unit 108 generates second subject distance information based on optical information including the first subject distance information and the entrance pupil distance information acquired in step S304. Then, the processing proceeds to step S309. In this case, the second subject distance information corresponds to an appropriate subject distance to be used for CG combining processing. As illustrated in FIG. 2, when the first subject distance information (the subject distance) is represented by OD1, the entrance pupil distance is represented by EP, and the second subject distance information (CG combining subject distance) is represented by OD2, the following formula (1) can be obtained.

$$OD2=OD1-EP \quad (1)$$

In step S307, the system control unit 108 acquires a coefficient in place of the entrance pupil distance information as information corresponding to the entrance pupil position. The coefficient acquired in place of the entrance pupil distance information is obtained by, for example, calculating the entrance pupil distance based on the actual measured value of the subject distance in each state of the lens 101, calculating a coefficient for converting the entrance pupil distance to a subject distance for CG combining processing, and storing the calculated coefficient. The coefficient acquired in place of the entrance pupil distance information can be acquired from the parameter storage unit 116. More alternatively, an input value obtained by using the operation unit 114 can be used as the coefficient, or the coefficient can be acquired via the external I/F unit 113. In step S308, third subject distance information is generated based on the coefficient acquired in place of the entrance pupil distance information acquired in step S307 and the first subject distance information acquired in step S304. Then, the processing proceeds to step S309. When the first subject distance information is represented by OD1, the coefficient acquired in place of the entrance pupil distance information is represented by K1, and the third subject distance information is represented by OD3, the following formula (2) can be obtained.

$$OD3=OD1 \cdot K1 \quad (2)$$

In step S309, the system control unit 108 generates image capturing information, such as a second horizontal field angle and a second vertical field angle, and selects the second subject distance information or the third subject distance information as CG combining subject distance information. When the first horizontal field angle is represented by AOV1_H, the first vertical field angle is represented by AOV1_V, the second horizontal field angle is represented by AOV2_H, the second vertical field angle is represented by AOV2_V, the diagonal length of the 35 mm fullsize sensor is represented by 35 mmFullSize_HV, and the diagonal length of the super 35 mm sensor is represented by Super35 mm_HV, the following formulas (3) and (4) can be obtained.

$$AOV2\_H = AOV1\_H \cdot \frac{Super35\,mm\_HV}{35\,mm\,FullSize\_HV} \quad (3)$$

$$AOV2\_V = AOV1\_V \cdot \frac{Super35\,mm\_HV}{35\,mm\,FullSize\_HV} \quad (4)$$

In step S310, the system control unit 108 associates the imaging information generated in step S309 and the pieces of lens information acquired in step S304 with frames obtained during image capturing, and stores the imaging information and lens information in association with the frames in the system memory 109. For example, the imaging information and lens information can be associated with the frames by synchronizing the frames with the various information using a time code. If video image recording is started in step S303, the recording can be completed in step S311.

An operation of the imaging information output unit 118 according to the present exemplary embodiment having the configuration as described above will now be described with reference to the block diagram illustrated in FIG. 1 and the flowchart illustrated in FIG. 4. The processing illustrated in FIG. 4 is repeatedly executed on an arbitrary predetermined cycle, such as an image capturing cycle. In the present exemplary embodiment, the image capturing cycle is used for the predetermined cycle.

First, in step S401, the system control unit 108 converts a data format for each mode for outputting various information generated by the imaging information generation unit 117 and information acquired by the lens information acquisition unit 115 (the converted data format being hereinafter referred to as metadata). In the present exemplary embodiment, a data format for outputting data via a network or a serial data interface (SDI) via the external I/F unit 113 and a data format for outputting data to the recording medium 112 through the recording medium I/F unit 111 are used by way of example. In step S402, the type of metadata to be output is selected. As the metadata to be output, metadata to be used for CG combining processing may be extracted, or all metadata may be output. Alternatively, the metadata may be changed based on a processing load on the image capturing apparatus 100 or other restrictions. In step S403, if the video image and metadata are output in synchronization with the frames of the captured image in real time, the metadata is output via a network or an SDI through the external I/F unit 113, and if the video image is recorded once, the metadata is output to the recording medium 112 through the recording medium I/F unit 111. Alternatively, these processes can be combined at once. If the video image and metadata are output in real time, a CG combining processing apparatus can be connected to the external I/F unit 113 to perform CG combining processing in real time. The frames and metadata to be output in this case can also be delayed depending on the CG combining processing apparatus.

As described above, in the present exemplary embodiment, even when the user cannot recognize information for CG combining processing, the information for CG combining processing is generated based on an entrance pupil position or information about a coefficient corresponding to the entrance pupil position, thereby making it possible to provide metadata for the user to accurately combine a video image with CG.

Second Exemplary Embodiment

Figure 5:
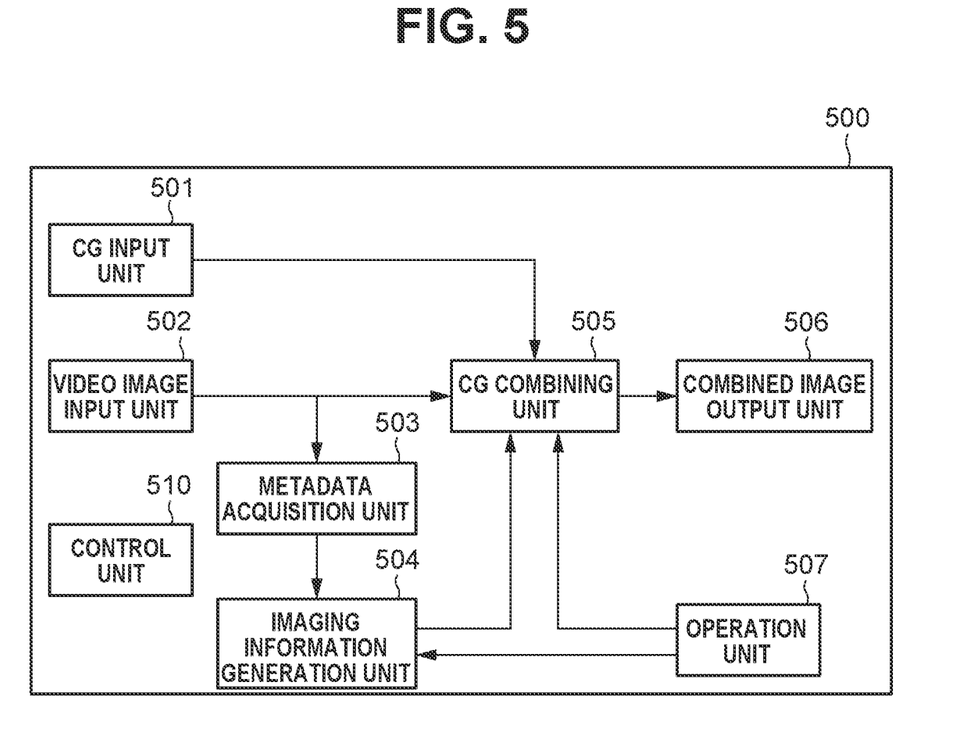
FIG. 5 is a block diagram illustrating a configuration example of an image processing apparatus according to the second exemplary embodiment.

In the first exemplary embodiment described above, metadata for CG combining processing is generated using the image capturing apparatus 100 by way of example. A second exemplary embodiment illustrates an example where an image processing apparatus combines an image with CG using metadata output with an image captured by the image capturing apparatus 100 described above in the first exemplary embodiment. FIG. 5 is a block diagram illustrating a configuration example of an image processing apparatus 500. The image processing apparatus 500 illustrated in FIG. 5 has a configuration different from the configuration according to the first exemplary embodiment, or is integrally formed with the image capturing apparatus 100 according to the first exemplary embodiment. The image processing apparatus 500 performs CG combining processing by superimposing CG and metadata synchronized with frames obtained from the image capturing apparatus 100 on the frames.

A CG input unit 501 inputs CG to be superimposed on a CG combining image to a CG combining unit 505.

A video image input unit 502 inputs the CG combining image. In this case, the video image input unit 502 can be connected to the image capturing apparatus 100 and can input a captured video image in real time, or can input a video image recorded on the image capturing apparatus 100. A metadata acquisition unit 503 acquires CG combining metadata synchronized with the image. The CG combining metadata can be acquired from the metadata superimposed on the image input by the video image input unit 502, or only the metadata can be acquired separately from the video image. More alternatively, the CG combining metadata can be acquired via a network, or can be directly input by the user. An imaging information generation unit 504 generates CG combining information (CG combining image field information) based on the metadata acquired by the metadata acquisition unit 503.

The CG combining unit 505 performs CG combining processing by superimposing the CG input by the CG input unit 501 on the image input by the video image input unit 502 using the information generated by the imaging information generation unit 504. A combined image output unit 506 outputs the combined image obtained by the CG combining unit 505 to a display apparatus, a recording medium, an external output I/F, and the like. As an output form, the combined image can be recorded on another recording medium through the external I/F, or can be transmitted to another connected video image input device, or can be transmitted via a network. An operation unit 507 is used to input drive conditions and make various settings for the image processing apparatus 500. The drive conditions and various setting values are transmitted to the imaging information generation unit 504 and the CG combining unit 505. A control unit 510 performs the overall control operation for the image processing apparatus 500 based on these pieces of information.

Figure 6:
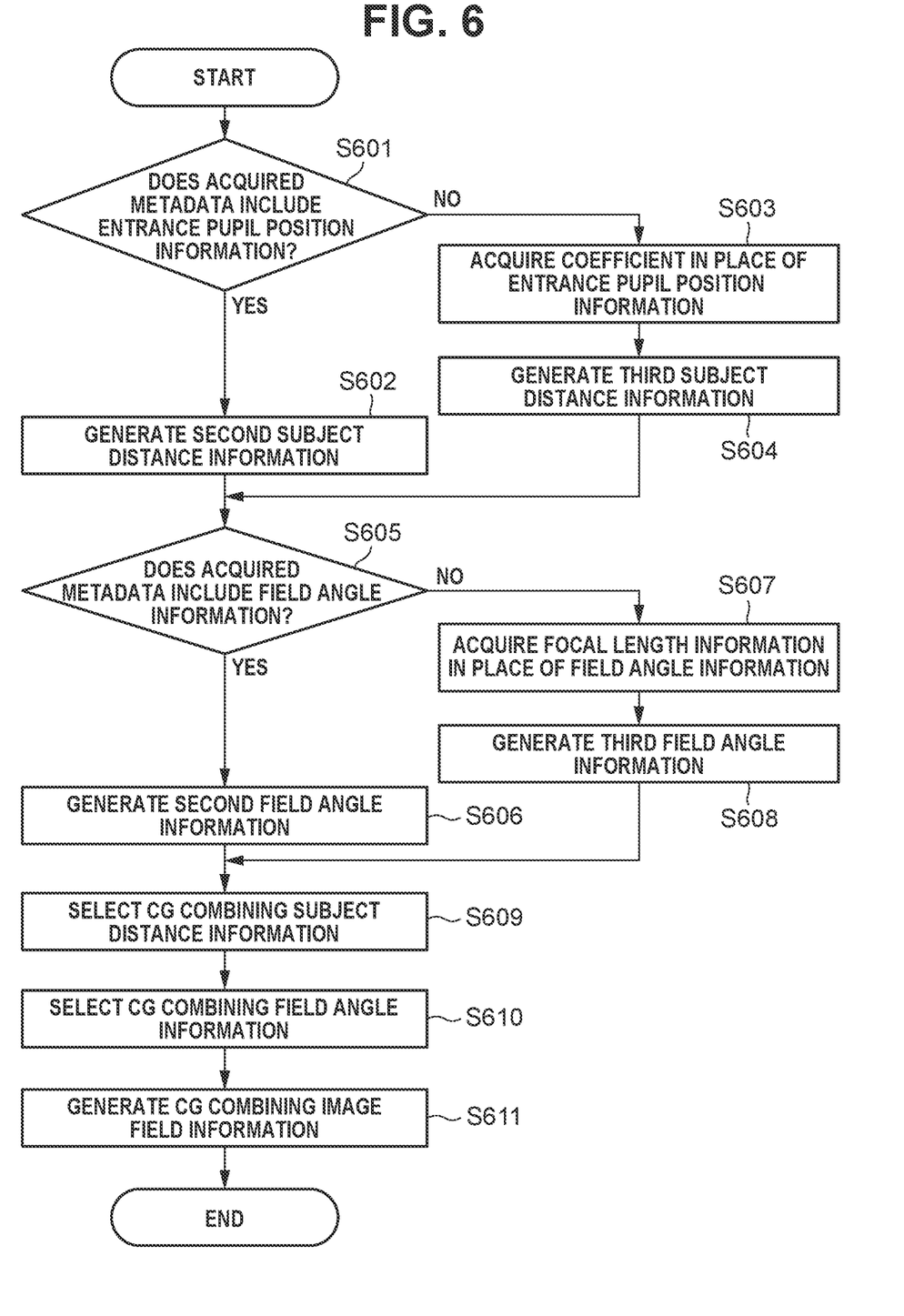
FIG. 6 is a flowchart illustrating CG combining metadata generation processing according to the second exemplary embodiment.

An operation of the imaging information generation unit 504 according to the present exemplary embodiment having the configuration as described above will now be described with reference to the block diagram illustrated in FIG. 5 and a flowchart illustrated in FIG. 6. The processing illustrated in FIG. 6 is repeatedly executed at an arbitrary predetermined cycle, such as an image capturing cycle. In the present exemplary embodiment, the image capturing cycle for combining processing is used for the predetermined cycle.

In step S601, the control unit 510 determines whether the metadata that is acquired by the metadata acquisition unit 503 and associated with the image includes entrance pupil position information. If it is determined that the metadata includes the entrance pupil position information (YES in step S601), the processing proceeds to step S602. If it is determined that the metadata does not include the entrance pupil position information (NO in step S601), the processing proceeds to step S603.

In step S602, the control unit 510 generates the second subject distance information based on the information acquired by the metadata acquisition unit 503, such as the first subject distance information, the entrance pupil distance information as information corresponding to the entrance pupil position, and the focus position. The processing then proceeds to step S605. As described above in the first exemplary embodiment, formula (1) can be obtained, where the first subject distance information is represented by OD1, the entrance pupil position is represented by EP, and the second subject distance information is represented by OD2.

In step S603, the control unit 510 acquires a coefficient in place of the entrance pupil position information from the metadata acquisition unit 503. The coefficient acquired in place of the entrance pupil position information is similar to that acquired in the first exemplary embodiment. The coefficient can be acquired from the metadata acquisition unit 503, or can be acquired from the operation unit 507.

In step S604, the control unit 510 generates the third subject distance information based on the coefficient acquired in place of the entrance pupil position information in step S603, the lens information acquired by the metadata acquisition unit 503, such as the first subject distance information and the entrance pupil position, imaging range information, and the like. The processing then proceeds to step S605. When the first subject distance information is represented by OD1, the coefficient acquired in place of the entrance pupil position information is represented by K1, and the third subject distance information is represented by OD3, formula (2) can be obtained. In step S605, it is determined whether the metadata acquired by the metadata acquisition unit 503 includes first horizontal field angle information and first vertical field angle information. If it is determined that the acquired metadata includes the first horizontal field angle information and the first vertical field angle information (YES in step S605), the processing proceeds to step S606. If it is determined that the acquired metadata does not include the first horizontal field angle information and the first vertical field angle information, the processing proceeds to step S607.

In step S606, the control unit 510 generates second horizontal field angle information and second vertical field angle information based on the information acquired by the metadata acquisition unit 503, such as the first horizontal field angle information, the first vertical field angle information, the lens information, and the image capturing information. The processing then proceeds to step S609. When the first horizontal field angle is represented by AOV1_H, the first vertical field angle is represented by AOV1_V, the second horizontal field angle is represented by AOV2_H, the second vertical field angle is represented by AOV2_V, the diagonal length of the 35 mm fullsize sensor is represented by 35 mmFullSize_HV, and the diagonal length of the super 35 mm sensor is represented by Super35 mm_HV, formulas (3) and (4) can be obtained.

In step S607, the control unit 510 acquires focal length information from the metadata acquisition unit 503. The focal length information can be acquired from the metadata acquisition unit 503 or the operation unit 507.

In step S608, the control unit 510 generates third horizontal field angle information and third vertical field angle information based on the focal length information acquired in place of the first horizontal field angle information and the first vertical field angle information in step S607, the imaging range information acquired by the metadata acquisition unit 503, and the like. Then, the processing proceeds to step S609.

In step S609, the control unit 510 determines CG combining subject distance information based on the second subject distance information generated in step S602 or the third subject distance information generated in step S604. In step S610, the control unit 510 determines CG combining field angle information based on the second horizontal field angle information and the second vertical field angle information generated in step S606 or the third horizontal field angle information and the third vertical field angle information generated in step S608. In step S611, CG combining image field information is calculated based on the CG combining subject distance information determined in step S609 and the CG combining field angle information determined in step S610.

Figure 7:
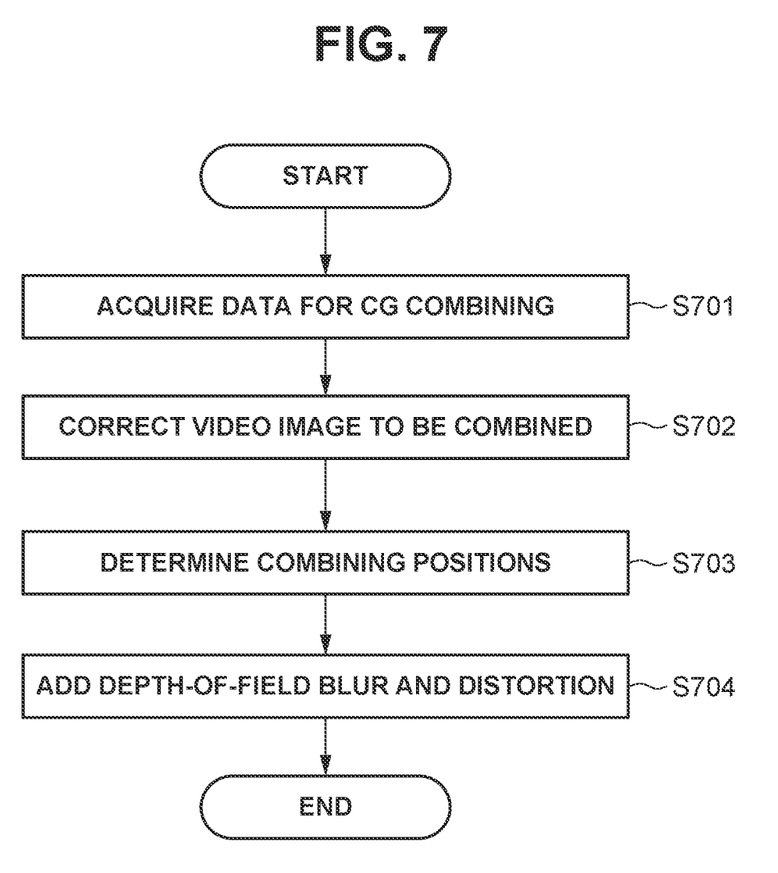
FIG. 7 is a flowchart illustrating CG combining processing using metadata according to the second exemplary embodiment.

An operation of the CG combining unit 505 according to the present exemplary embodiment having the configuration as described above will now be described with reference to the block diagram illustrated in FIG. 5 and a flowchart illustrated in FIG. 7. The processing illustrated in FIG. 7 is repeatedly executed at an arbitrary predetermined cycle, such as an image capturing cycle. In the present exemplary embodiment, the image capturing cycle for combining processing is used for the predetermined cycle. In step S701, an image used for CG combining processing, a CG object, a background to be combined, metadata information acquired by the metadata acquisition unit 503, information generated by the imaging information generation unit 504, and the like are prepared. These pieces of information are loaded to CG combining software.

The CG object used for CG combining processing and the background to be combined can be input through the CG input unit 501, or can be developed to be used in the software.

In step S702, the control unit 510 corrects a distortion, marginal illumination, or the like on the image to be combined based on the metadata information acquired by the metadata acquisition unit 503 and the information generated by the imaging information generation unit 504. In the present exemplary embodiment, the CG combining subject distance information and CG combining field angle information generated by the imaging information generation unit 504, the CG combining image field information, and the like are used.

In step S703, the control unit 510 calculates the positional relationship between the CG object and the background to be combined with the image to be combined by using the metadata information acquired by the metadata acquisition unit 503 and the information generated by the imaging information generation unit 504. The control unit 510 then determines the combining positions of the CG object and the background.

In step S704, the CG combining unit 505 adds a depth-of-field blur and a distortion in the CG object and the background to be combined with the image to be combined by using the metadata information acquired by the metadata acquisition unit 503 and the information generated by the imaging information generation unit 504.

While the exemplary embodiments of the present disclosure have been described in detail above, the present disclosure is not limited to the specific exemplary embodiments. Various modifications can be made without departing from the scope of the disclosure.

While the above-described exemplary embodiments illustrate an example where the subject distance information is generated based on the entrance pupil position acquired through communication from the lens 101 or acquired by inputting any value by the user, the subject distance information can be generated based on information acquired by any other method. For example, entrance pupil position data depending on the focal length and focus position of a lens to be used can be held in a camera and can be referenced as needed. Alternatively, the entrance pupil position depending on the focal length and focus position of a lens to be used can be referenced on a web via a network.

Third Exemplary Embodiment

Figure 8:
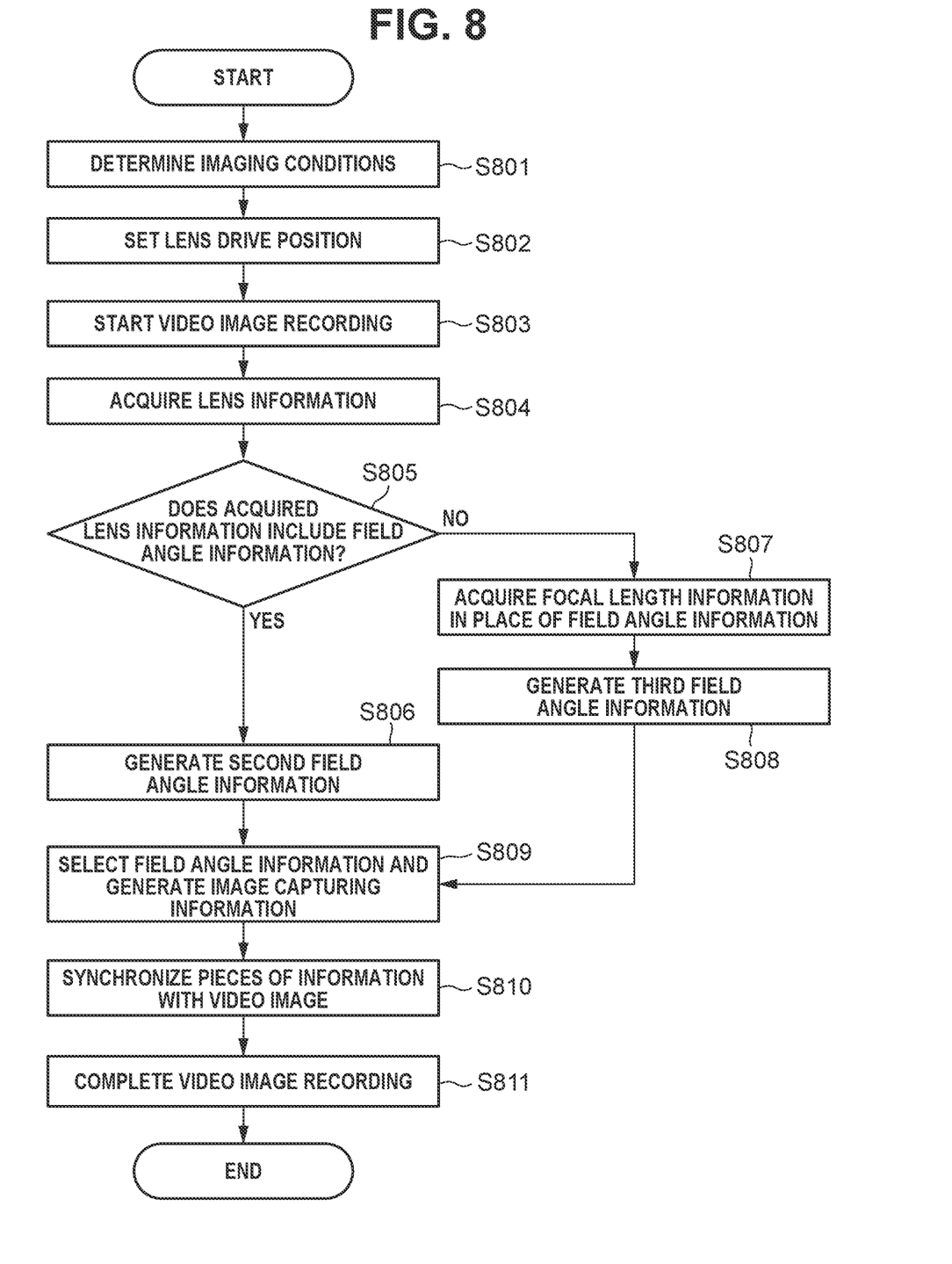
FIG. 8 is a flowchart illustrating CG combining metadata generation processing according to the third exemplary embodiment.

While the first exemplary embodiment described above illustrates an example where subject distance information is generated as metadata for CG combining processing in the image capturing apparatus 100, a third exemplary embodiment illustrates an example where information about field angles is generated as metadata for CG combining processing in the image capturing apparatus 100. An example of an imaging information generation method will be described with reference to the block diagram illustrated in FIG. 1 and a flowchart illustrated in FIG. 8. The processing illustrated in FIG. 8 is repeatedly executed on an arbitrary predetermined cycle, such as an image capturing cycle. In the present exemplary embodiment, the image capturing cycle is used for the predetermined cycle.

In step S801, the system control unit 108 determines imaging conditions and sets an exposure area for the image sensor 105. In the present exemplary embodiment, a super 35 mm area is set in a 35 mm fullsize sensor, but instead any other imaging range can be set.

In step S802, the system control unit 108 sets the imaging position, the focal length, the focus position, and the like at initial positions. These settings can be made using the focus ring or the zoom ring mounted on the lens 101, or through communication from the operation unit 114 to the lens 101.

In step S803, the system control unit 108 can start video image recording, or video image delivering via the external I/F unit 113 without recording the video image. In this case, the focal length, the focus position, and the like can be changed at any time. In step S804, the system control unit 108 acquires lens information including focal length information and field angle information (first horizontal field angle and first vertical field angle) from the lens information acquisition unit 115.

In step S805, the system control unit 108 determines whether the lens information acquired in step S804 includes the field angle information. If the system control unit 108 determines that the acquired lens information includes the field angle information (YES in step S805), the processing proceeds to step S806. If the system control unit 108 determines that the acquired lens information does not include the field angle information (NO in step S805), the processing proceeds to step S807. In step S806, the system control unit 108 generates second horizontal field angle information and second vertical field angle information based on the first horizontal field angle information, the first vertical field angle information, and the lens information acquired in step S804 and the imaging conditions determined in step S801. The processing then proceeds to step S809. Formulas (3) and (4) can be obtained when the first horizontal field angle is represented by $AOV1\_H$, the first vertical field angle is represented by $AOV1\_V$, the second horizontal field angle is represented by $AOV2\_H$, the second vertical field angle is represented by $AOV2\_V$, the diagonal line of the 35 mm fullsize sensor is represented by 35 mmFullSize_HV, and the diagonal line of the super 35 mm sensor is represented by Super35 mm_HV. In step S807, the system control unit 108 acquires focal length information in place of the first horizontal field angle information and the first vertical field angle information. The focal length information can be acquired from the lens information acquisition unit 115, or can be acquired using the parameter storage unit 116 or the operation unit 114, or can be acquired via the external I/F unit 113. In step S808, the system control unit 108 generates third horizontal field angle information and third vertical field angle information based on the focal length information acquired in place of the first horizontal field angle information and the first vertical field angle information acquired in step S807, the imaging range information determined in step S801, and the like. Then, the processing proceeds to step S809. In the imaging range information determined in step S801, the following formulas (5) and (6) can be obtained when the horizontal imaging range is represented by Super35 mm_H, the vertical imaging range is represented by Super35 mm_V, the focal length is represented by FL, the third horizontal field angle is represented by AOV3_H, and the third vertical field angle is represented by AOV3_V.

$$AOV3\_H = 2 \cdot \tan^{-1}\left(\frac{Super\,35\,mm\_H}{FL}\right) \quad (5)$$

$$AOV3\_V = 2 \cdot \tan^{-1}\left(\frac{Super\,35\,mm\_V}{FL}\right) \quad (6)$$

In step S809, the system control unit 108 selects the second horizontal field angle and second vertical field angle information or the third horizontal field angle and third vertical field angle information as the CG combining field angle information, and generates image capturing information, such as the second subject distance information as CG combining subject distance information, horizontal image field information, and vertical image field information.

In step S810, the system control unit 108 associates the image capturing information generated in step S809 and the pieces of lens information acquired in step S804 with frames obtained during image capturing, and stores the image capturing information and the pieces of information associated with the frames in the system memory 109. For example, the image capturing information and the pieces of information can be associated with frames by synthesizing the frames with the various information using time code. If video image recording is started in step S803, the recording can be completed in step S811.

As described above, even when the user cannot recognize information for CG combining processing, field angle information for CG combining processing is generated based on imaging information, thereby making it possible to provide metadata for the user to accurately combine CG with a video image.

Fourth Exemplary Embodiment

Figure 9:
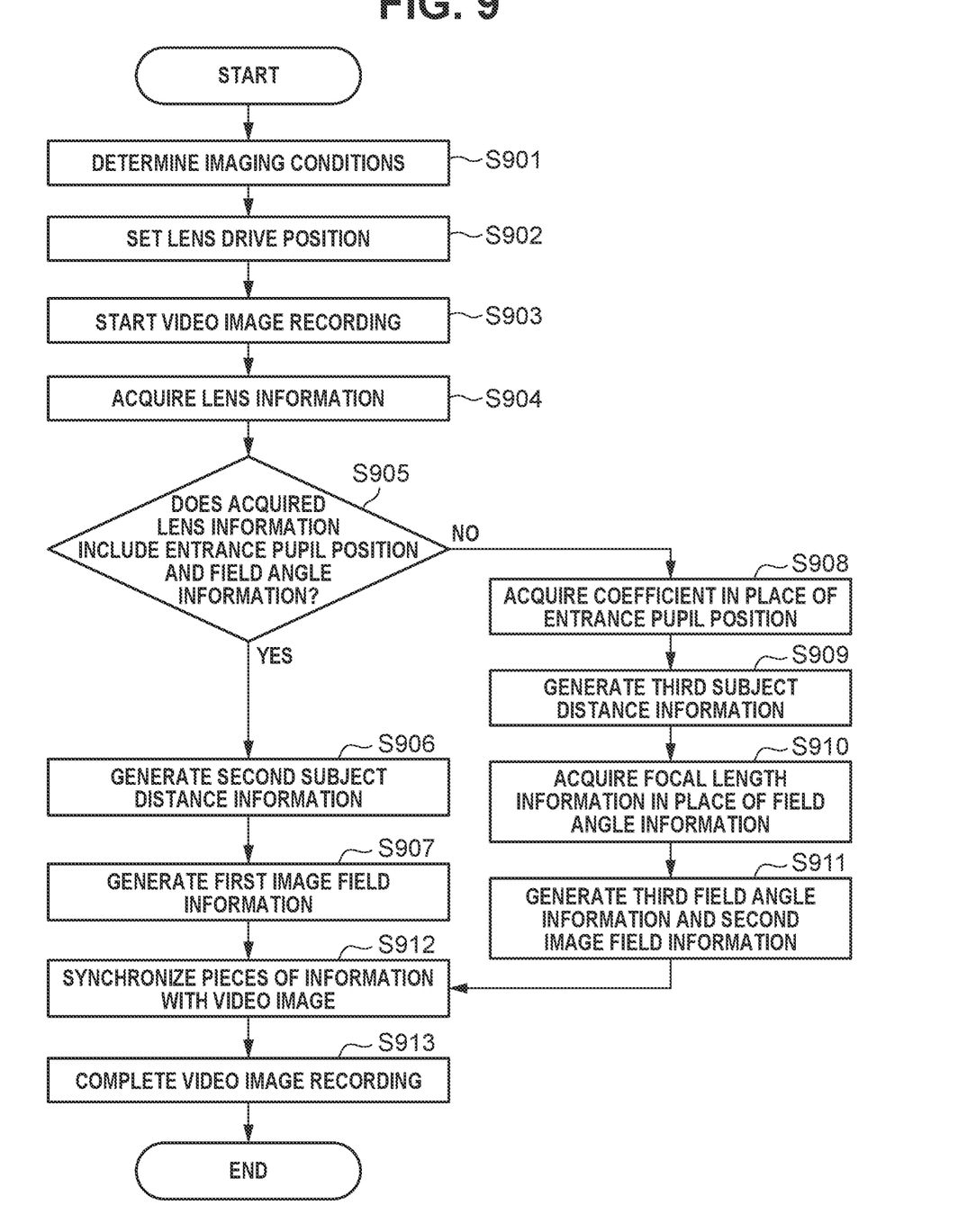
FIG. 9 is a flowchart illustrating CG combining metadata generation processing according to the fourth exemplary embodiment.

While the first exemplary embodiment described above illustrates an example where the subject distance information is used to generate metadata for CG combining processing in the image capturing apparatus 100, a fourth exemplary embodiment illustrates an example where information about image fields is generated as metadata for CG combining processing in the image capturing apparatus 100. An example of an imaging information generation method will be described with reference to the block diagram illustrated in FIG. 1 and a flowchart illustrated in FIG. 9. The processing illustrated in FIG. 9 is repeatedly executed at an arbitrary predetermined cycle, such as an image capturing cycle. In the present exemplary embodiment, the image capturing cycle is used for the predetermined cycle.

In step S901, the system control unit 108 determines imaging conditions and sets an exposure area for the image sensor 105. In the present exemplary embodiment, a super 35 mm area is set in a 35 mm fullsize sensor, but instead any other imaging range can be set.

In step S902, the system control unit 108 sets the imaging position, the focal length, the focus position, and the like at initial positions. These settings can be made using the focus ring or the zoom ring mounted on the lens 101, or through communication from the operation unit 114 to the lens 101.

In step S903, the system control unit 108 can start video image recording, or video image delivering via the external I/F unit 113 without recording the video image. In this case, the focal length, the focus position, and the like can be changed at any time.

In step S904, the system control unit 108 acquires lens information, including focal length information, first subject distance information, and field angle information (first horizontal field angle and first vertical field angle), from the lens information acquisition unit 115.

In step S905, the system control unit 108 determines whether the lens information acquired in step S904 includes the entrance pupil position and field angle information. If the system control unit 108 determines that the acquired lens information includes the entrance pupil position and field angle information (YES in step S905), the processing proceeds to step S906. If the system control unit 108 determines that the acquired lens information does not include the entrance pupil position and field angle information (NO in step S905), the processing proceeds to step S908.

In step S906, the system control unit 108 generates the second subject distance information based on the first subject distance information and the lens information acquired in step S904 and the imaging conditions determined in step S901. Then, the processing proceeds to step S907. Formula (1) can be obtained when the first subject distance information is represented by OD1, the entrance pupil position is represented by EP, and the second subject distance information is represented by OD2.

In step S907, the system control unit 108 generates second horizontal field angle information and second vertical field angle information based on the second subject distance information generated in step S906, the first horizontal field angle information, the first vertical field angle information, and the lens information acquired in step S904, and the imaging conditions determined in step S901, and thereafter generates first image field information (first horizontal image field information and first vertical image field information). Then, the processing proceeds to step S912. Formulas (3) and (4) are obtained when the first horizontal field angle is represented by AOV1_H, the first vertical field angle is represented by AOV1_V, the second horizontal field angle is represented by AOV2_H, the second vertical field angle is represented by AOV2_V, the diagonal line of the 35 mm fullsize sensor is represented by 35 mmFullSize_HV, and the diagonal line of the super 35 mm sensor is represented by Super35 mm_HV.

When the first horizontal image field is represented by FOV1_H and the first vertical image field is represented by FOV1_V, the following formulas (7) and (8) can be obtained.

$$FOV1\_H = OD2 \cdot 2 \cdot \tan\left(\frac{AOV2\_H}{2}\right) \quad (7)$$

$$FOV1\_V = OD2 \cdot 2 \cdot \tan\left(\frac{AOV2\_V}{2}\right) \quad (8)$$

In step S908, the system control unit 108 acquires a coefficient in place of the entrance pupil position. The coefficient can be acquired from the parameter storage unit 116, or can be acquired using the operation unit 114, or can be acquired via the external I/F unit 113. In step S909, the system control unit 108 generates the third subject distance information based on the coefficient acquired in place of the entrance pupil position in step S908, the first subject distance information acquired in step S904, and the imaging conditions determined in step S901. Then, the processing proceeds to step S910. Formula (2) is obtained when the first subject distance information is represented by OD1, the coefficient acquired in place of the entrance pupil position is represented by K1, and the third subject distance information is represented by OD3.

In step S910, the system control unit 108 acquires focal length information in place of the first horizontal field angle information and the first vertical field angle information. The focal length information can be acquired from the lens information acquisition unit 115, or can be acquired using the parameter storage unit 116 or the operation unit 114, or can be acquired via the external I/F unit 113.

In step S911, the system control unit 108 generates third field angle information (third horizontal field angle information and third vertical field angle information) based on the focal length information acquired in place of the first horizontal field angle information and the first vertical field angle information acquired in step S907, the focal length information acquired in step S904, and the imaging conditions determined in step S901. Thereafter, the system control unit 108 generates second field angle information (second horizontal field angle information and second vertical field angle information), and then generates second horizontal image field information and second vertical image field information. Then, the processing proceeds to step S912. Formulas (5) and (6) are obtained when the horizontal imaging range is represented by Super35 mm_H, the vertical imaging range is represented by Super35 mm_V, the focal length is represented by FL, the third horizontal field angle is represented by AOV3_H, and the third vertical field angle is represented by AOV3_V, in the imaging conditions determined in step S901. Further, when the second horizontal image field is represented by FOV2_H and the second vertical image field is represented by FOV2_V, the following formulas (9) and (10) can be obtained.

$$FOV2\_H = OD3 \cdot 2 \cdot \tan\left(\frac{AOV3\_H}{2}\right) \quad (9)$$

$$FOV2\_V = OD3 \cdot 2 \cdot \tan\left(\frac{AOV3\_V}{2}\right) \quad (10)$$

In step S912, the system control unit 108 associates the imaging information generated in step S911 and the pieces of information acquired in step S904 with frames obtained during image capturing, and stores the imaging information and the pieces of information associated with the frames in the system memory 109. For example, the imaging information and the pieces of information can be associated with the frames by synchronizing the frames with the various information using time code. If video image recording is started in step S903, the recording can be completed in step S913.

As described above, image field information for CG combining processing is generated based on imaging information even when the user cannot recognize information for CG combining processing, thereby making it possible to provide metadata for the user to accurately combine CG with a video image.

While the present disclosure is described in detail above based on the exemplary embodiments, the present disclosure is not limited to these specific exemplary embodiments. Various modifications can be made without departing from the scope of the disclosure. Further, some of the exemplary embodiments described above can also be extracted and combined as needed. In each exemplary embodiment, the CG combining subject distance information, the CG combining field angle information, the CG combining image field information are calculated by various methods, but instead can be obtained by any other method.

According to an aspect of the present disclosure, it is possible to implement appropriate CG combining processing even when the user can recognize only a distance from an imaging plane to a subject as subject distance information.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-031995, filed Mar. 2, 2022, which is hereby incorporated by reference herein in its entirety.

What is claimed is:

1. An image processing apparatus comprising:
one or more memories storing instructions; and
one or more processors that, upon execution of the instructions, is configured to operate as:
an acquisition unit configured to acquire an image and first subject distance information, corresponding to the image and indicating a distance from an image sensor to a subject, which are generated by an image capturing apparatus including the image sensor configured to capture a light beam from a subject through an optical lens;
a generation unit configured to generate second subject distance information indicating a distance from the image capturing apparatus to the subject based on information corresponding to an entrance pupil position of the optical lens used to capture the image, a focus position, and the first subject distance information; and
an output unit configured to output, as metadata, the second subject distance information generated by the generation unit in association with the image.

2. The image processing apparatus according to claim 1, wherein the information corresponding to the entrance pupil position of the optical lens is information indicating an entrance pupil distance of the optical lens.

3. The image processing apparatus according to claim 1, wherein the information corresponding to the entrance pupil position of the optical lens is information stored based on an actual measured value in each state of the optical lens.

4. The image processing apparatus according to claim 1, wherein the generation unit generates image field information, based on information corresponding to a field angle of each of the optical lens and the image sensor used to capture the image and information about a size of the image sensor.

5. The image processing apparatus according to claim 4, wherein the output unit configured to output, as metadata, the image field information generated by the generation unit in association with the image.

6. The image processing apparatus according to claim 4, wherein the information corresponding to the field angle is generated based on a focal length for capturing the image.

7. The image processing apparatus according to claim 1, further comprising a computer graphics (CG) combining unit configured to combine one of the image and a video image with CG using the metadata.

8. The image processing apparatus according to claim 1, wherein the output unit synchronizes the image and the metadata and outputs the image and the metadata in real time.

9. A control method for an image processing apparatus, the control method comprising:
acquiring an image and first subject distance information, corresponding to the image and indicating a distance from an image sensor to a subject, which are generated by an image capturing apparatus including the image sensor configured to capture a light beam from a subject through an optical lens;
generating second subject distance information indicating a distance from the image capturing apparatus to the subject based on information corresponding to an entrance pupil position of the optical lens used to capture the image, a focus position, and the first subject distance information; and
outputting, as metadata, the second subject distance information generated by the generation unit in association with the image.

10. The control method according to claim 9, wherein the information corresponding to the entrance pupil position of the optical lens is information indicating an entrance pupil distance of the optical lens.

11. The control method according to claim 10, wherein in the outputting, as metadata, the image field information in association with the image.

12. The control method according to claim 9, wherein the information corresponding to the entrance pupil position of the optical lens is information stored based on an actual measured value in each state of the optical lens.

13. The control method according to claim 9, wherein image field information is generated, based on information corresponding to a field angle of each of the optical lens and the image sensor used to capture the image and information about a size of the image sensor.

14. The control method according to claim 13, wherein the information corresponding to the field angle is generated based on a focal length for capturing the image.

15. The control method according to claim 9, further comprising combining one of the image and a video image with CG using the metadata.

16. The control method according to claim 9, wherein the image and the metadata are synchronized and output the image and the metadata in real time.

* * * * *